United States Patent
Ruch et al.

(10) Patent No.: US 7,317,614 B2
(45) Date of Patent: Jan. 8, 2008

(54) COMPUTER DEVICE COOLING SYSTEM

(75) Inventors: Mark H. Ruch, The Woodlands, TX (US); Jeffrey A. Lev, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/254,369

(22) Filed: Oct. 19, 2005

(65) Prior Publication Data

US 2007/0086157 A1    Apr. 19, 2007

(51) Int. Cl.
*G06F 1/20* (2006.01)

(52) U.S. Cl. .................... 361/687; 165/185; 62/259.2; 361/697

(58) Field of Classification Search ............... 165/80.3, 165/199.33, 185; 361/695, 697, 679–687, 361/724–727; 437/209, 221; 62/289.2
See application file for complete search history.

(56) References Cited

U.S. PATENT DOCUMENTS

| 6,111,748 | A  | * | 8/2000  | Bhatia ........................ 361/695 |
| 6,226,178 | B1 | * | 5/2001  | Broder et al. ............... 361/687 |
| 6,459,576 | B1 |   | 10/2002 | Bhatia et al. |
| 6,460,608 | B1 |   | 10/2002 | Katsui |
| 6,804,115 | B2 |   | 10/2004 | Lai |
| 6,867,971 | B2 |   | 3/2005  | Lai |
| 2005/0243514 | A1 | * | 11/2005 | Malone et al. ............... 361/697 |
| 2005/0280988 | A1 | * | 12/2005 | Wyatt et al. ................ 361/687 |

* cited by examiner

*Primary Examiner*—Hung Van Duong

(57) ABSTRACT

A computer device comprises at least two operational components disposed within a housing of the computer device. The computer device also comprises a cooling system thermally coupled to the at least two operational components, the cooling system configured to receive an airflow through at least one inlet and discharge the airflow through at least two outlets to dissipate thermal energy generated by the at least two operational components.

28 Claims, 2 Drawing Sheets

COMPUTER DEVICE COOLING SYSTEM

BACKGROUND OF THE INVENTION

Computer devices, such as laptop or notebook computers, can generate high thermal loads during operation. In order to reduce or eliminate the likelihood of heat-related damage to the computer device, computer devices comprise cooling systems to dissipate the thermal loads. One type of system comprises providing a fan within the computer device to remove the heat that is generated by a heat source. However, increased levels of functionality provided in such computer devices has resulted in increased thermal loads, thereby requiring additional fans to dissipate the thermal energy, which consume a substantial amount of space within the computer device, require additional power, and increase the weight and manufacturing cost of the computer device.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
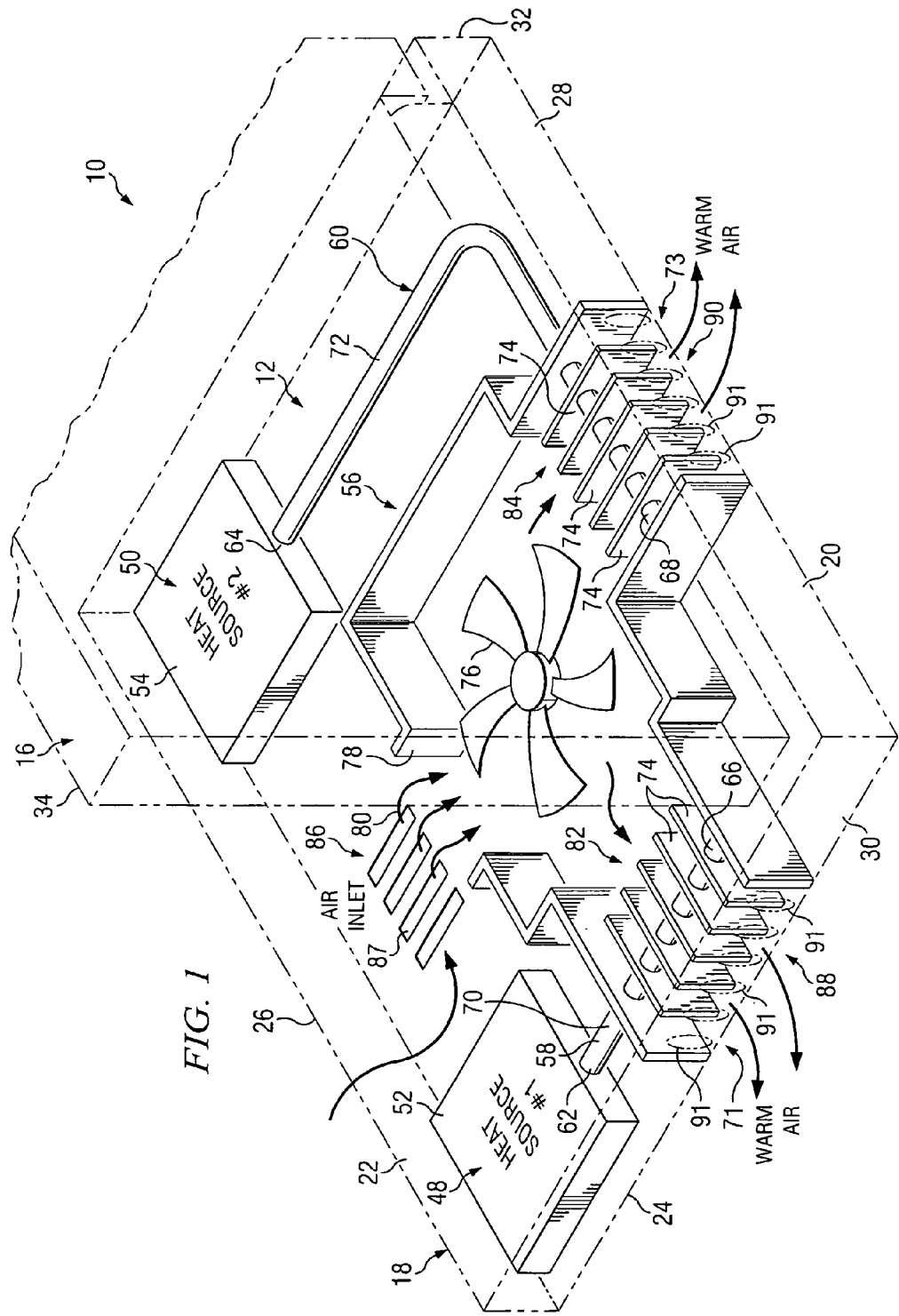
FIG. 1 is a perspective view of an interior area of an embodiment of a computer device cooling system in accordance with the present invention.
Figure 2:
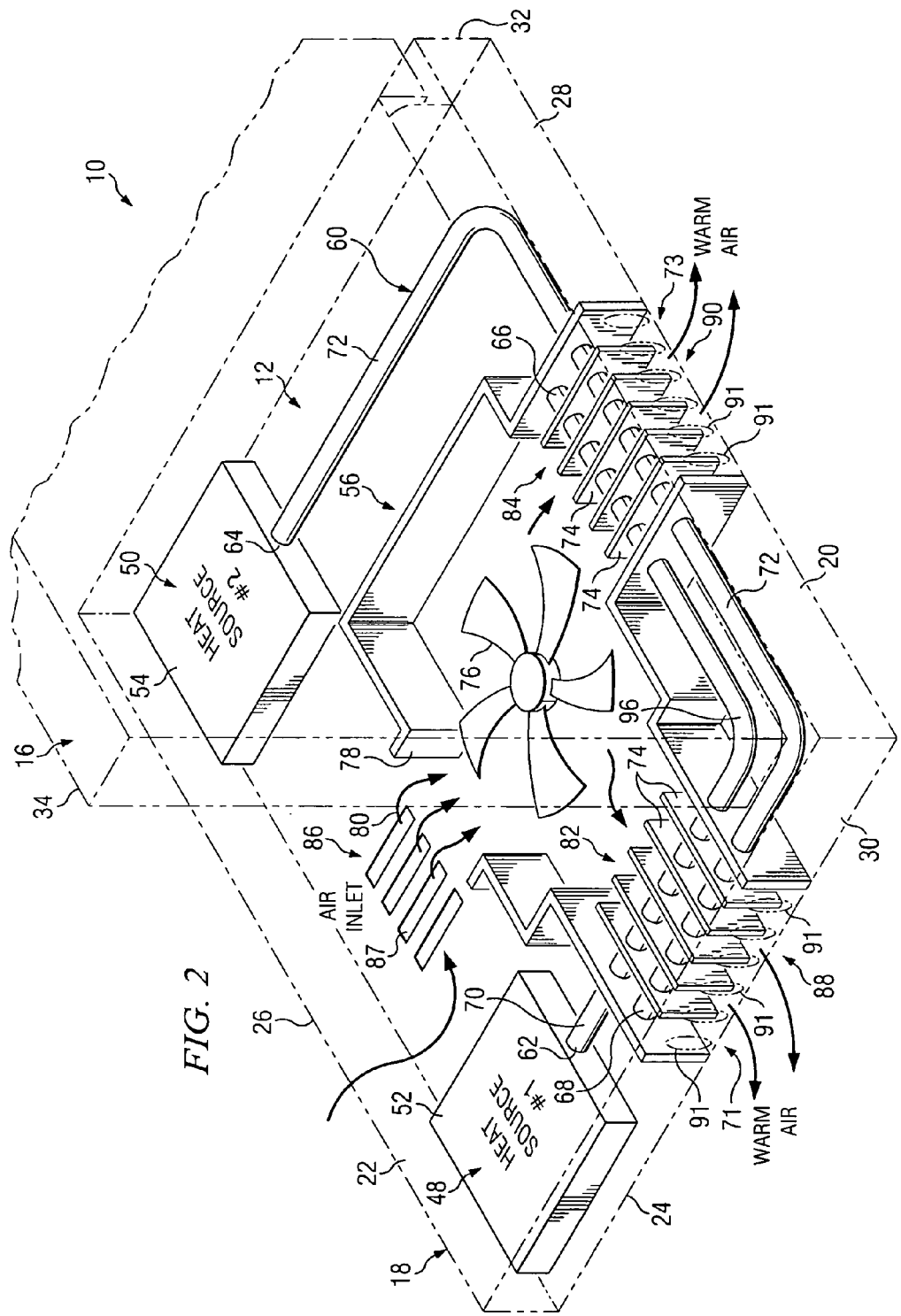
FIG. 2 is a perspective view of an interior area of another embodiment of a computer device cooling system in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a perspective view of an interior area of an embodiment of a computer device 10 employing a cooling system 12 to advantage in accordance with the present invention. In the embodiment illustrated in FIG. 1, computer device 10 may comprise any type of portable computer device such as, but not limited to, a laptop or notebook computer, tablet personal computer, or other type of handheld computing device. In the embodiment illustrated in FIG. 1, computer device 10 comprises a display member 16 having a housing 34 rotatably coupled to a base member 18. Base member 18 comprises a housing 20 having a working surface 22, a bottom surface 24, a front surface 26, a rear surface 28 and a pair of side surfaces 30 and 32.

In the embodiment illustrated in FIG. 1, cooling system 12 is disposed within housing 20 of base member 18 and is configured to dissipate and/or otherwise remove thermal energy from an internal area of base member 18 generated by computer operational components 48 and 50 disposed in base member 18. Computer operational components 48 and 50 may comprise a variety of different types of operational components of computer device 10 (e.g., batteries, disk drives, optical drives or any other device used in the operation of computer device 10). In the embodiment illustrated in FIG. 1, computer operational components 48 and 50 comprise a processor 52 and a graphics chip 54, which during normal operation tend to generate relatively high thermal loads, thereby increasing the temperature within housing 20. Further, it should be understood that cooling system 12 may be otherwise located (e.g., within housing 34 of display member 16 to dissipate heat generated from operational components disposed within display member 16).

In the embodiment illustrated in FIG. 1, cooling system 12 comprises a heat removal device 56 having at least two heat transport elements 58 and 60. First ends 62 and 64 of transport elements 58 and 60 are couplable to and/or otherwise configured to be located near respective operational components 48 and 50 for transferring thermal energy generated by operational components 48 and 50 away from operational components 48 and 50 toward respective second ends 66 and 68 of transport elements 58 and 60. Heat transport elements 56 and 58 may comprise any type of thermally conductive element capable of transferring heat from first ends 62 and 64 toward second ends 66 and 68 of transport elements 58 and 60 and away from respective operational components 48 and 50. In the embodiment illustrated in FIG. 1, heat transport elements 58 and 60 comprise heat pipes 70 and 72, respectively, preferably filled with a vaporizable liquid to increase heat transfer performance. However, it should be understood that various components of heat removal device 56 may be otherwise configured and/or manufactured.

In the embodiment illustrated in FIG. 1, heat exchangers 71 and 73 are disposed at or near second ends 66 and 68 of respective heat transport elements 58 and 60, each heat exchanger 71 and 73 having a plurality of fins 74 to facilitate thermal energy dissipation from heat pipes 70 and 72. In the embodiment illustrated in FIG. 1, heat removal device 56 comprises a fan 76, such as, but not limited to, a low profile centrifugal blower type fan, having at least one inlet 78 associated therewith to receive cooling air 80 therethrough and outlets 82 and 84 associated therewith for discharging cooling air 80. In the embodiment illustrated in FIG. 1, heat exchangers 71 and 73 are aligned with and/or otherwise positioned near respective outlets 82 and 84 to facilitate cooling air 80 flow across and/or through heat exchangers 71 and 73 and discharge thereof through respective housing outlets 88 and 90. In the embodiment illustrated in FIG. 1, housing outlets 88 and 90 are disposed on surfaces 30 and 28, respectively, of housing 20. However, it should be understood that housing outlets 88 and/or 90 may be otherwise located.

In operation, cooling air 80 is drawn into housing 20 by fan 76 through a housing inlet 86 having a plurality of apertures 87 and into inlet 78 of heat removal device 56. Cooling air 80 exits heat removal device 56 via outlets 82 and 84 and flows across heat exchangers 71 and 73, thereby dissipating thermal energy transferred from operational components 48 and 50 by heat transport elements 58 and 60. In the embodiment illustrated in FIG. 1, the warmed cooling air exits housing 20 through housing outlets 88 and 90 each having a plurality of apertures 91. It should be understood that heat removal device 56 may comprise a greater number of outlets (e.g., in addition to outlets 82 and 84) to accommodate additional heat transport elements and/or heat exchangers. Further, it should be understood that a greater number of housing inlets 86 may be used and/or may be otherwise located on housing 20 (e.g., in surfaces 22, 26, 28, 30 and/or 32 in addition to or in lieu of bottom surface 24). It should also be understood that a greater or fewer number of housing airflow outlets 88 and 90 may be used and/or may be otherwise located on housing 20.

Thus, in some embodiments of the present invention, a single fan 76 is used to dissipate thermal energy generated by at least two different of operational components 48 and 50 by transferring the thermal energy generated by respective operational components 48 and 50 toward two different heat exchangers 71 and 73 and two different outlets 88 and 90, respectively. For example, in the embodiment illustrated in FIG. 1, each operational component 48 and 50 is associated with a different heat exchanger 71 and 73 which may each be independently sized or configured to provide thermal energy dissipation characteristics corresponding to the expected thermal energy generation associated of respective components 48 and 50.

In some embodiments of the present invention, outlets 82 and 84 of heat removal device 56 are sized and/or otherwise configured to provide thermal energy dissipation characteristics corresponding to the expected thermal energy generation associated with respective components 48 and 50. For example, if the amount of thermal energy generation by component 48 is expected to be less than the amount of thermal energy generation by component 50, outlet 82 may be sized smaller than outlet 84, thereby providing an increased level of airflow volume through outlet 84 for dissipating thermal energy associated with component 50. It should also be understood that heat pipes 70 and 72 and/or heat exchangers 71 and 73 may be sized to provide thermal energy dissipation characteristics corresponding to the expected thermal energy generation associated of respective components 48 and 50. For example, a length and/or diameter of heat pipes 70 and/or 72 may be sized to accommodate a desired level of thermal energy dissipation corresponding to expected thermal energy generation associated with respective components 48 and 50.

FIG. 2 is a perspective view of an interior area of another embodiment of computer device 10 with cooling system 12 in accordance with the present invention. In the embodiment illustrated in FIG. 2, cooling system 12 comprises heat pipes 70 and 72 coupled to respective heat exchangers 71 and 73, and heat exchangers 71 and 73 are aligned with and/or otherwise disposed near respective airflow discharge outlets 82 and 84 and housing outlets 88 and 90. In the embodiment illustrated in FIG. 2, heat pipe 70 comprises a portion 96 extending beyond heat exchanger 71 to heat exchanger 73, and heat pipe 72 comprises a portion 98 extending beyond heat exchanger 73 to heat exchanger 71.

In the embodiment illustrated in FIG. 2, cooling system 12 takes advantage of additional and/or excess thermal energy dissipation capacity that may be available from either heat exchanger 71 or 73. For example, if a processing load is relatively low for operational component 48, thereby resulting in reduced thermal energy generation by operational component 48, additional thermal energy dissipation capacity associated with heat exchanger 71 is used to dissipate thermal energy associated with operational component 50. In operation, portion 98 of heat pipe 72 wicks at least a portion of the thermal energy generated by operational component 50 to heat exchanger 71 for dissipation thereby. The above example is also reversibly applicable (e.g., thermal energy generated by operational component 48 dissipated by heat exchanger 73 by transfer thereto using portion 96 of heat pipe 70). Thus, embodiments of the present invention automatically regulate and/or otherwise causes a thermal energy dissipation balancing for operational components 48 and 50, thereby increasing thermal energy dissipation efficiency.

What is claimed is:

1. A computer device, comprising:
   at least two operational components disposed within a housing of the computer device; and
   a cooling system thermally coupled to the at least two operational components, the cooling system configured to receive an airflow through at least one inlet and discharge the airflow through at least two outlets to direct the discharged airflow from the at least two outlets to a heat exchange to dissipate thermal energy generated by the at least two operational components.

2. The computer device of claim 1, wherein the cooling system comprises a plurality of thermally conductive heat transfer elements respectively coupled to the at least two operational components.

3. The computer device of claim 1, wherein one of the at least two outlets is sized smaller than another of the at least two outlets.

4. The computer device of claim 1, wherein the cooling system comprises at least two heat exchangers.

5. The computer device of claim 1, wherein the cooling system comprises at least two heat exchangers each associated with at least one different operational component.

6. The computer device of claim 1, wherein the cooling system is thermally coupled to the at least two operational components by at least two respective heat pipes.

7. The computer device of claim 1, wherein at least one of the operational components is thermally coupled to at least two heat exchangers.

8. The computer device of claim 1, wherein at least one of the operational components is coupled to one heat exchanger by one portion of a heat transfer element and another heat exchanger by another portion of the heat transfer element.

9. The computer device of claim 1, wherein the housing comprises a portable computer housing.

10. A computer device, comprising:
    means for drawing an airflow through at least one inlet means of a housing means of the computer device and discharging the airflow through at least two outlet means to direct the discharges airflow from the at least two outlet means to a heat exchanging means for dissipating thermal energy generated by at least two operational components of the computer device.

11. The computer device of claim 10, further comprising means for thermally coupling the at least two operational components to at least two heat exchanging means.

12. The computer device of claim 10, further comprising means for thermally coupling at least one of the operational components to two heat exchanging means.

13. The computer device of claim 10, wherein one of the at least two outlet means is sized smaller than another of the at least two outlet means.

14. The computer device of claim 10, further comprising a heat transfer means having one portion coupling at least one operational component to one heat exchanging means and another portion coupling the at least one operational component to another heat exchanging means.

15. A method of manufacturing a computer device, comprising:
    providing at least two operational components disposed within a housing of the computer device; and
    configuring a cooling system thermally coupled to the at least two operational components to receive an airflow through at least one inlet and discharge the airflow through at least two outlets to direct the discharged airflow from the at least two outlets to a heat exchanger to dissipate thermal energy generated by the at least two operational components.

16. The method of claim 15, further comprising thermally coupling the at least two operational components to at least two heat exchangers.

17. The method of claim 15, further comprising thermally coupling at least one of the operational components to at least two heat exchangers.

18. The method of claim 15, further comprising sizing one of the at least two outlets smaller than another one of the at least two outlets.

19. The method of claim 15, further comprising coupling at least one of the operational components to a heat exchanger by a heat pipe.

20. The method of claim 15, further comprising configuring one portion of a heat transfer element to couple at least one operational component to one heat exchanger and another portion of the heat transfer element to couple the one heat exchanger to another heat exchanger.

21. The method of claim 15, further comprising disposing the cooling system in a portable computer housing.

22. A computer device, comprising:
    a cooling system configured to automatically balance dissipation of thermal energy generated by at least two operational components of the computer device between at last two different heat exchangers.

23. The computer device of claim 22, wherein at least one of the operational components is coupled to the at least two different heat exchangers.

24. The computer device of claim 22, further comprising a heat transfer element coupling at least one of the operational components to the at least two different heat exchangers.

25. The computer device of claim 22, further comprising one portion of a heat transfer element coupling at least one of the operational components to one of the at least two different heat exchangers and another portion of the heat transfer element coupling the one heat exchanger to another one of the at least two different heat exchangers.

26. The computer device of claim 22, further comprising a plurality of heat transfer elements each thermally coupling at least one respective operational component to the at least two different heat exchangers.

27. The computer device of claim 22, wherein the cooling system is configured to utilize a thermal energy dissipation capacity of one of the at least two different heat exchangers for at least one operational component coupled to another one of the at least two different heat exchangers.

28. A computer device, comprising:
    at least two operational components disposed within a housing of the computer device; and
    a cooling system thermally coupled to the at least two operational components, the cooling system comprising a fan configured to receive an airflow through at least one inlet of the fan and discharge the airflow through at least two outlets of the fan to a heat exchanger to dissipate thermal energy generated by the at least two operational components.

\* \* \* \* \*

UNITED STATES PATENT AND TRADEMARK OFFICE
CERTIFICATE OF CORRECTION

PATENT NO. : 7,317,614 B2
APPLICATION NO. : 11/254369
DATED : January 8, 2008
INVENTOR(S) : Mark H. Ruch et al.

It is certified that error appears in the above-identified patent and that said Letters Patent is hereby corrected as shown below:

In the Claims:

In column 4, line 4, in Claim 1, delete "exchange" and insert -- exchanger --, therefor.

In column 4, line 36, in Claim 10, delete "discharges" and insert -- discharged --, therefor.

Signed and Sealed this
Eleventh Day of February, 2014

Michelle K. Lee
*Deputy Director of the United States Patent and Trademark Office*